(12) United States Patent
Begin

(10) Patent No.: US 11,771,072 B2
(45) Date of Patent: Oct. 3, 2023

(54) CONVERTIBLE TUBE ADAPTER

(71) Applicant: Jason Begin, Roswell, GA (US)

(72) Inventor: Jason Begin, Roswell, GA (US)

(*) Notice: Subject to any disclaimer, the term of this patent is extended or adjusted under 35 U.S.C. 154(b) by 135 days.

(21) Appl. No.: 17/379,938

(22) Filed: Jul. 19, 2021

(65) Prior Publication Data

US 2023/0019505 A1 Jan. 19, 2023

(51) Int. Cl.
*A01K 97/10* (2006.01)

(52) U.S. Cl.
CPC .................................. *A01K 97/10* (2013.01)

(58) Field of Classification Search
CPC ...................................................... A01K 97/10
USPC .......................... 248/511, 514, 515, 518, 521
See application file for complete search history.

(56) References Cited

U.S. PATENT DOCUMENTS

| | | | | |
|---|---|---|---|---|
| 4,827,654 A * | 5/1989 | Roberts | ................... | A01K 97/10 248/514 |
| 7,296,377 B2 * | 11/2007 | Wilcox | ................... | A01K 97/10 248/541 |
| 7,757,424 B2 * | 7/2010 | Follmar | ................... | A01K 97/10 248/521 |
| 7,774,973 B2 * | 8/2010 | Carnevali | .......... | F16M 11/2078 248/516 |
| 8,146,879 B2 * | 4/2012 | Liao | ........................ | A45B 11/00 248/278.1 |
| 8,286,572 B1 * | 10/2012 | Picek | ...................... | A01K 97/10 114/364 |
| 2008/0022578 A1 * | 1/2008 | Follmar | ................... | A01K 97/10 43/21.2 |
| 2008/0053361 A1 * | 3/2008 | Nicholson | .............. | A01K 91/08 114/364 |
| 2008/0155881 A1 * | 7/2008 | Carnevali | .............. | A01K 97/10 43/21.2 |
| 2011/0006968 A1 * | 1/2011 | Morrow | .................. | H01Q 1/084 343/882 |
| 2011/0225870 A1 * | 9/2011 | Carnevali | .............. | A01K 97/10 43/21.2 |
| 2013/0019515 A1 * | 1/2013 | Holzer | ................... | A01K 97/10 43/21.2 |
| 2014/0047758 A1 * | 2/2014 | Ciciulla | ................. | A01K 99/00 43/21.2 |
| 2015/0181854 A1 * | 7/2015 | Vannieuwenhoven | ...................... | A01K 97/10 43/21.2 |

(Continued)

*Primary Examiner* — Kimberly T Wood

(57) ABSTRACT

A convertible tube adapter including a top connection point, a shaft, a bottom connection point and a knob. The top connection point includes a plurality of connection contacts integrated on a first side of the top connection point, a fastener receiving surface integrated on a second side of the top connection point and an aperture incorporated between the plurality of connection contacts and the fastener receiving surface. The shaft is configured for insertion into a tube which is fixedly integrated into an object. The shaft includes a pair of bumpers located on each side, which each extends outward from a side surface of the shaft. The bottom connection point is attached to a bottom end of the shaft and includes a carve-out structure integrated into its rear surface which is configured to receive a mating pin positioned at the bottom of the tube to prevent the adapter from rotating in the tube. The adapter is configured to effectively convert the tube into a mount when the shaft is inserted into the tube by allowing an article to attach to the top connection point of the adapter.

11 Claims, 5 Drawing Sheets

(56) References Cited

U.S. PATENT DOCUMENTS

| | | | |
|---|---|---|---|
| 2015/0198190 A1* | 7/2015 | Carnevali | F16B 7/0413 |
| | | | 403/371 |
| 2015/0366180 A1* | 12/2015 | Chmura | A01K 97/10 |
| | | | 248/125.7 |
| 2022/0279770 A1* | 9/2022 | Chmura | A01K 97/10 |

* cited by examiner

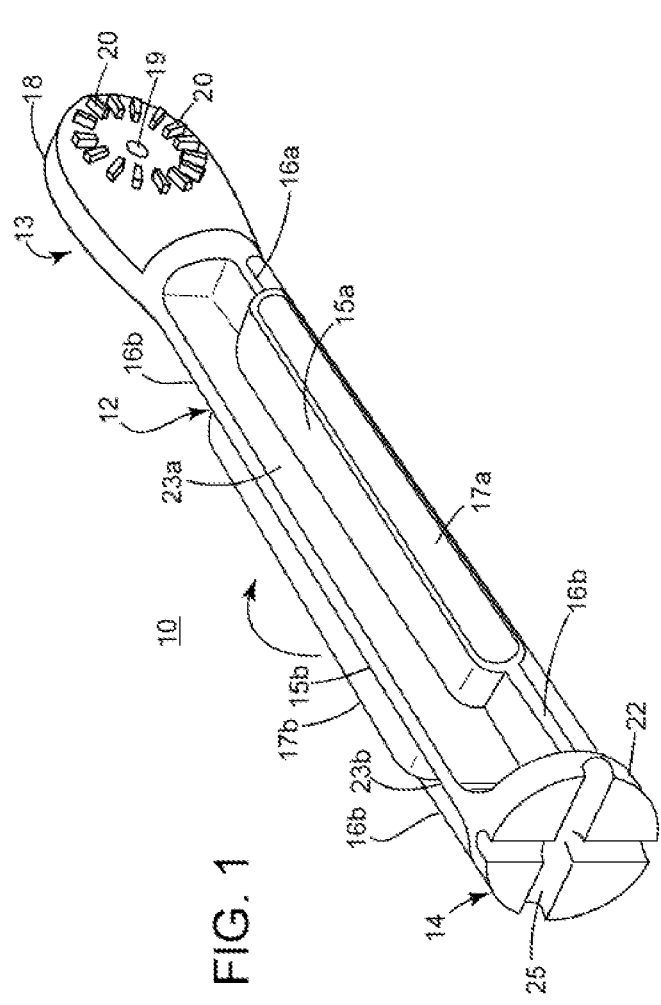
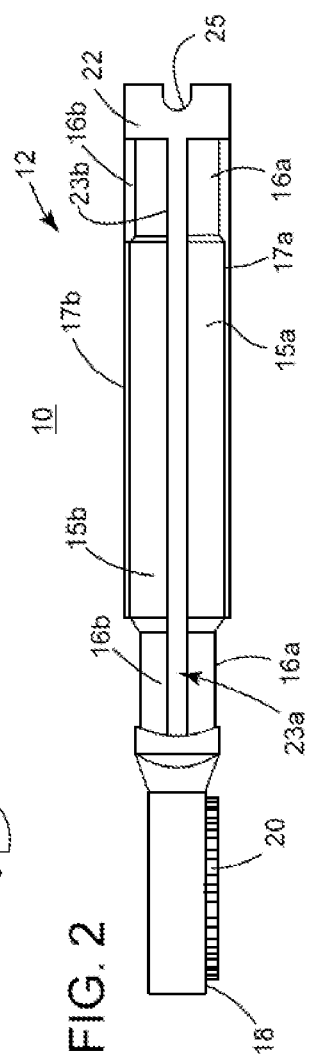

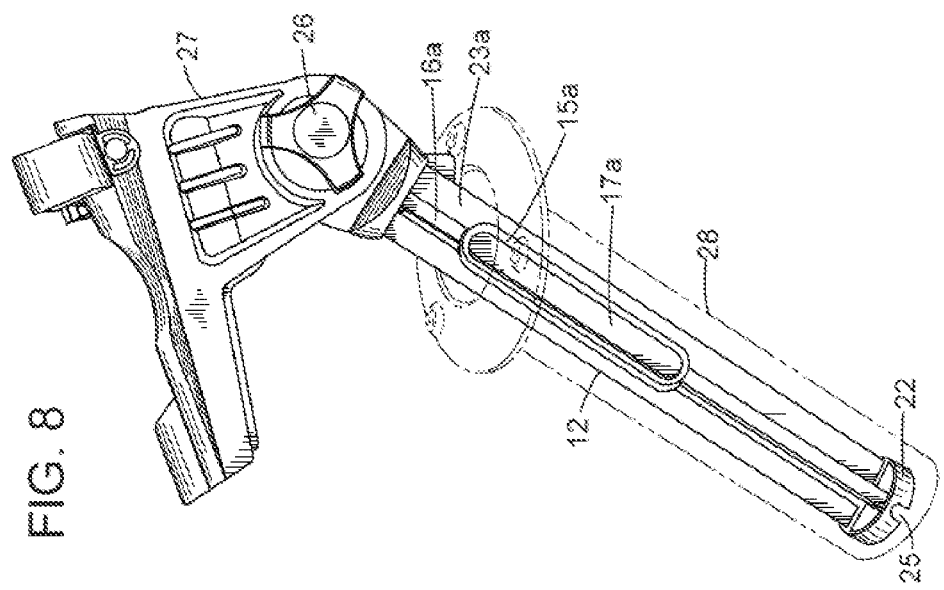
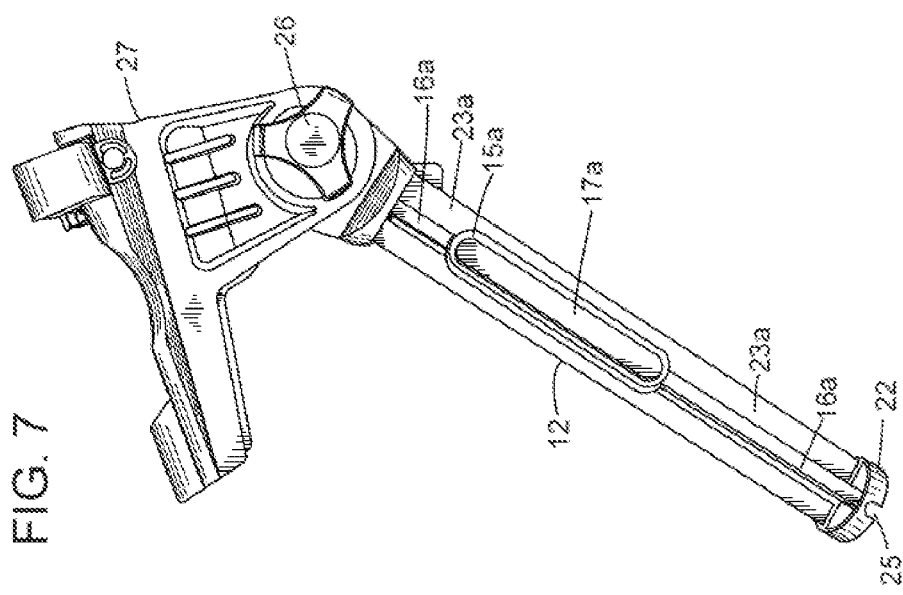

CONVERTIBLE TUBE ADAPTER

FIELD OF THE INVENTION

Embodiments described herein generally relate to an adapter, and more particularly to a convertible tube adapter.

BACKGROUND OF THE INVENTION

Rod holders are common on many fishing boats and kayaks. Flush mount and gunwale style rod holders are commonly installed into the gunwale of a boat. These tubular rod holders typically include a tube where a handle member of a fishing rod is dropped for use during trolling. These rod holders typically do not allow for any adjustability or repositioning of the rod; thus, it may be necessary to use an accessory with these types of rod holders to allow for repositioning of a rod.

Moreover, the tubular rod holders are very functionally specific and do not allow for a variety of usage. Oftentimes, people may desire to use other accessories on the boat, such as, for example, a net holder, a cutting table, etc., which may require a mount to attach to the boat for use. Typically, people do not like drilling holes in their boats to mount things with permanent fasteners. Hence, it would be desirable to be able to use an existing rod holder, which is already integrated on a boat, as a mount to be able to use a variety of accessories without having to drill holes in the boat.

BRIEF DESCRIPTION OF THE DRAWINGS

Elements in the figures have not necessarily been drawn to scale in order to enhance their clarity and to improve an understanding of these various elements and embodiments of the invention. Furthermore, elements that are known to be common and well understood to those in the industry may not be depicted in order to provide a clear view of the various embodiments of the invention.

The various advantages of the embodiments of the present disclosure will become apparent to one skilled in the art by reading the following specification and appended claims, and by referencing the following drawing(s), in which:

FIG. 1 shows an exemplary side perspective view of a convertible tube adapter according to an embodiment of the present disclosure.

FIG. 2 shows an exemplary side view of the convertible tube adapter according to an embodiment of the present disclosure.

FIG. 7 shows another exemplary view of the convertible tube adapter attached to an accessory according to an embodiment of the present disclosure.

FIG. 8 shows an exemplary view of the convertible tube adapter attached to an accessory and inserted into a tube according to an embodiment of the present disclosure.

SUMMARY OF THE INVENTION

Figure 3:
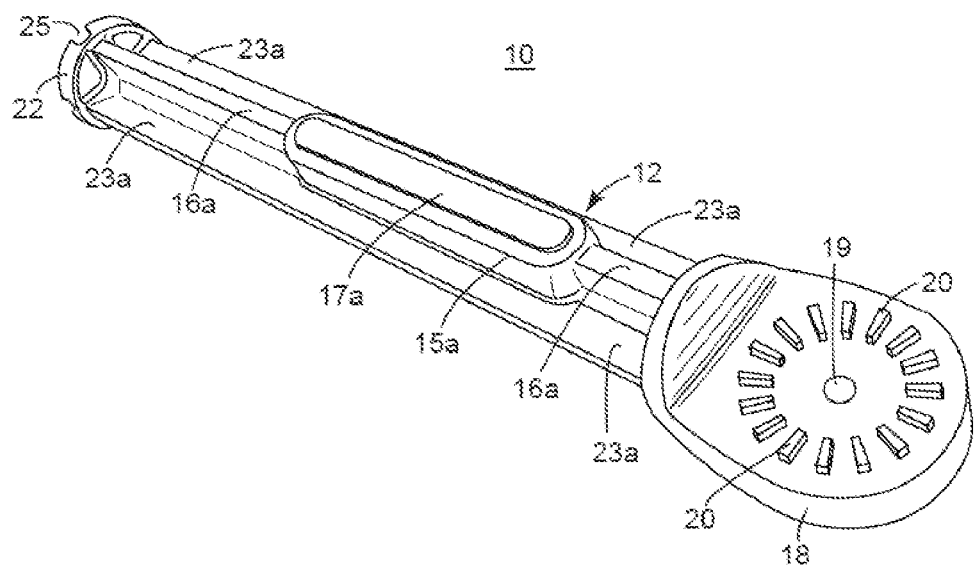
FIG. 3 shows an exemplary front perspective of the convertible tube adapter according to an embodiment of the present disclosure.

Exemplary embodiments disclosed herein describe a convertible tube adapter including a top connection point, a shaft, a base and a knob. The top connection point includes a plurality of connection contacts integrated on a first side of the top connection point, a fastener receiving surface integrated on a second side of the top connection point and an aperture incorporated between the plurality of connection contacts and the fastener receiving surface. The shaft is configured for insertion into a tube which is fixedly integrated into an object. The shaft includes a pair of bumpers located on each side, which each extends outward from a side surface of the shaft. The bottom connection point base is attached to a bottom end of the shaft and includes a carve-out structure integrated into its rear surface which is configured to receive a mating pin positioned at the bottom of the tube to prevent the adapter from rotating in the tube. The adapter is configured to effectively convert the tube into a mount when the shaft is inserted into the tube by allowing an article to attach to the top connection point of the adapter.

In some exemplary embodiments, the adapter includes a knob having a threaded aperture to receive a fastener.

In some exemplary embodiments, the knob is configured to interface with the article to connect the article to the top connection point.

In some exemplary embodiments, the pair of bumpers each extend outward from a corresponding side surface of the shaft.

In some exemplary embodiments, the shaft includes support structures positioned on each side of the shaft.

In some exemplary embodiments, each support structure is positioned on each side of each bumper.

In some exemplary embodiments, the pair of bumpers each include an insert integrated on a top surface of each respective bumper.

In some exemplary embodiments, the pair of bumpers are each configured to provide outward pressure on an inside surface of the tube by way of the insert to thereby keep the bottom connection point of the adapter engaged with the mating pin.

In some exemplary embodiments, the carve-out has a shape commensurate with the mating pin structure.

In some exemplary embodiments, the carve-out has a cross shape.

In some exemplary embodiments, the bottom connection point base is oriented perpendicular relative to the shaft.

In some exemplary embodiments, the aperture includes a threaded internal structure.

In some exemplary embodiments, the plurality of connection contacts are configured to attach to an article having an interface which mates with the plurality of connection contacts.

In some exemplary embodiments, the top connection point allows for three hundred and sixty degree fore and aft pivot and positioning.

DETAILED DESCRIPTION

The present disclosure describes a convertible tube adapter which is configured to convert a tube/tubular structure/tube frame (e.g., a tubular rod holder), which is fixedly integrated into another object (e.g., boat), into a mounting point or connection point where an external article (e.g., an accessory) may be connected thereto. This aspect effectively converts the tube into a mounting point (i.e., mount), which allows increased and versatile use of the tube/tubular structure, thereby obviating the need to permanently modify the structure of the object in which the tube is integrated, in order to provide a way to mount an article (i.e., accessory) to the object. The adapter includes bumpers to provide a stable and secure mounting point. It should be noted that the terms article and accessory have been used interchangeably throughout the disclosure.

The convertible tube adapter may be made out of any suitable material, such as, for example, plastic, acrylic or metal. In a preferred embodiment, the convertible tube adapter is made out of plastic. Moreover, the convertible tube adapter may be configured in any suitable shape. In a preferred embodiment, the convertible tube adapter has a shape which allows for insertion of the convertible tube adapter into a tube/tubular structure. It should be noted that the terms tube, tubular structure and tube frame have been used interchangeably throughout the disclosure.

Figure 4:
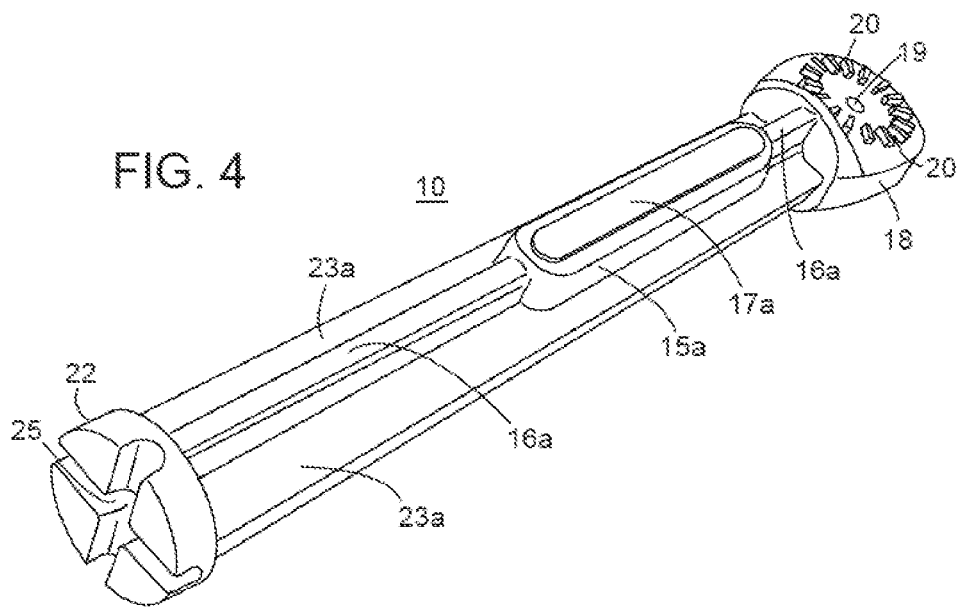
FIG. 4 shows another exemplary front perspective of the convertible tube adapter according to an embodiment of the present disclosure.
Figure 5:
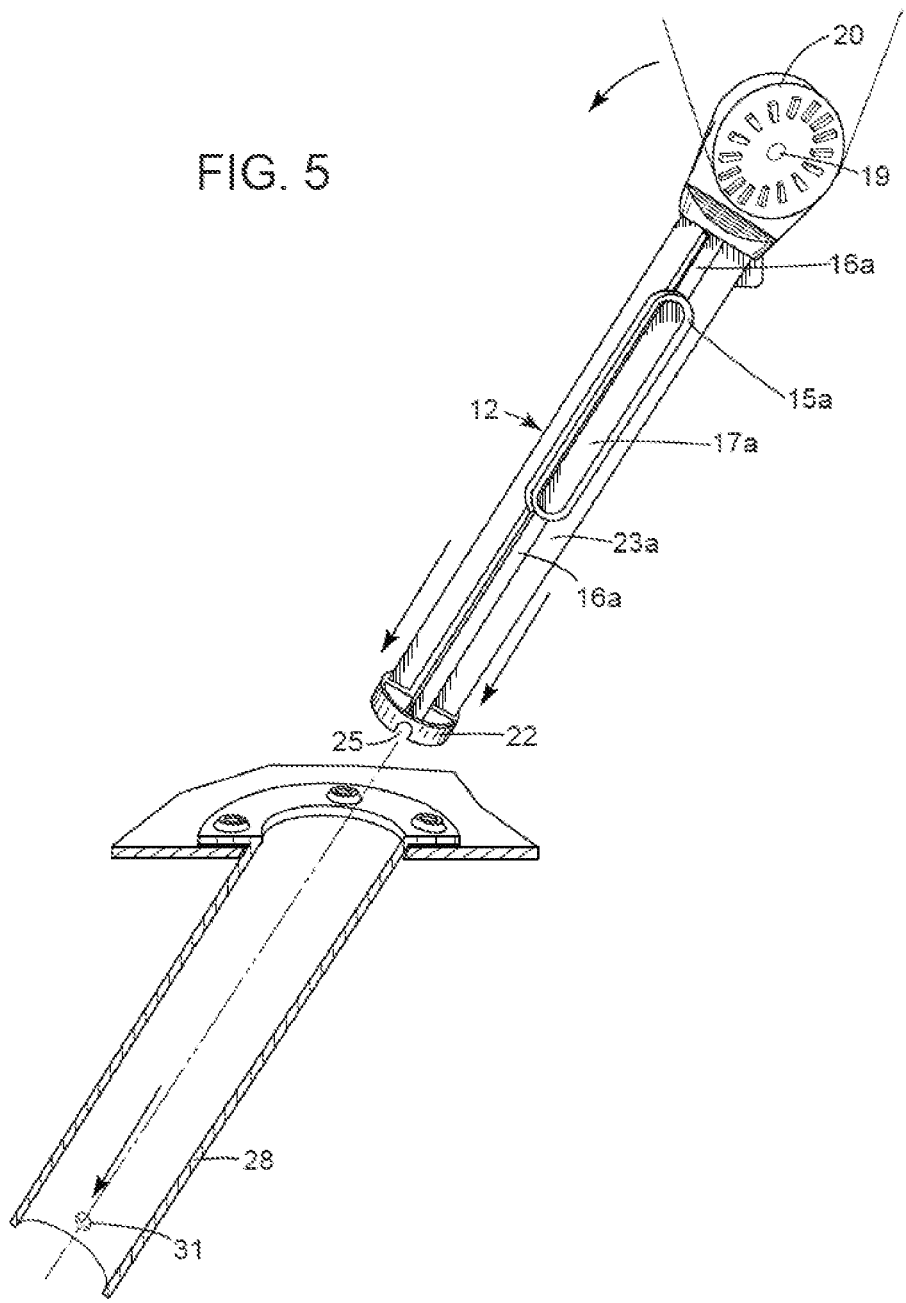
FIG. 5 shows an exemplary view illustrating how the bottom connection point of the convertible tube adapter is attached to an object an according to an embodiment of the present disclosure
Figure 6:
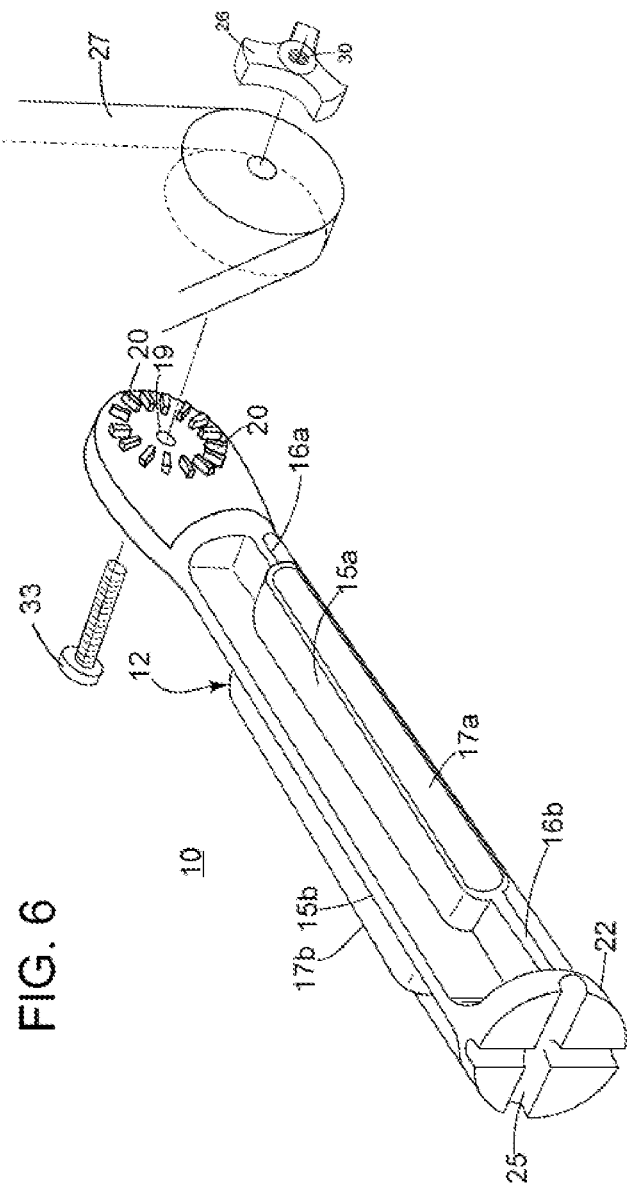
FIG. 6 shows an exemplary view illustrating how the bottom connection point of the convertible tube adapter is attached to an accessory according to an embodiment of the present disclosure.

Turning to FIGS. 1-8, the convertible tube adapter ("the adapter") 10 may include a shaft (i.e., body) 12, a top connection point 18, a bottom connection point (i.e., base) 22 and a knob 26. The shaft is the body of the adapter and the top connection point 18 and the bottom connection point 22 each provide a point of connection where the adapter 10 may be attached to an external accessory/object. The top connection point is attached to a top end of the shaft and may be used to attach an accessory (e.g., accessory 27). An accessory may include an adjustable rod holder, a net holder, a cutting board, a bait holder, a handle, etc. The bottom connection point 22 is attached to a bottom end of the shaft and may be used to anchor (i.e., to hold in place) the adapter in a stationary object, such as, for example, a tube 28 (e.g., a gunwale rod holder).

The shaft 12 includes a pair of bumpers 15a and 15b which operate to stabilize the adapter 10 in the tube 28. Each bumper is positioned on a corresponding side 23a, 23b of the shaft and each corresponding side is opposite one another. Each bumper may be attached to a top surface of the shaft (e.g., the top surface of sidewalls 23a, 23b) and may protrude (i.e., extend outward) from the top surface of the shaft. Each bumper includes an insert 17a, 17b on its top layer which is configured to create friction with an adjoining inner wall of the tube 28.

It is important that the adapter 10 has a secure and tight fit in the tube 28 so that the adapter does not accidentally come out of the tube while being used as a mount. To that regard, the bumpers 15a and 15b aid in ensuring a secure and tight fit of the adapter in the tube. When the adapter is installed (i.e., inserted) in the tube, the protrusion of the bumpers provide lateral support to stabilize the adapter by pressing on an adjoining inner side wall of the tube. Moreover, the inserts 17a and 17b provide friction upon the adjoining inner side of the tube which helps to hold the adapter in place.

The bumpers 15a and 15b may be made out of any suitable material. In a preferred embodiment, the bumpers are made out of plastic. The bumpers may be configured in any suitable shape. In a preferred embodiment, the bumpers have an oval shape. The inserts 17a and 17b may be made out of any material suitable to create friction upon a surface. In a preferred embodiment, the inserts are made out of rubber. Rubber intrinsically exhibits sliding friction and when slid on a hard surface, the surface asperities exert oscillating forces on the rubber surface leading to energy dissipation which is the internal friction of the rubber. Hence, when the adapter 10 is installed in the tube 28, by sliding the adapter into the tube, the inserts 17a, 17b each provide friction upon the adjoining inner side of the tube, which helps to secure and stabilize the adapter in place in the tube 28.

Moreover, the shaft includes support structures 16a and 16b which each provide support to a corresponding bumper 15a, 15b on the shaft 12. The support structures provide the necessary stiffness and strength needed to resist any forces upon bumpers 15a, 15b to prevent any displacement. The support structures 16a and 16b may be made out of any suitable material. In a preferred embodiment, the support structures are made out of plastic. The support structures may be configured in any suitable shape.

The top connection point 18 includes a plurality of connection contacts 20 integrated on a first side of the top connection point, a fastener receiving surface 21 integrated on a second side of the top connection point, and an aperture 19 integrated therebetween the plurality of connection contacts and the fastener receiving surface. The aperture 19 may include internal threading. The plurality of connection contacts may be configured as a female interface or a male interface. So, for example, in FIGS. 1-4, the connection contacts 20 are configured as a male interface (i.e., the connection contacts are external to the top surface of the top connection point). The plurality of connection contacts may be arranged in a circular fashion and may each be an equidistance apart from one another.

Moreover, the top connection point 18 provides a pivoting interface and a positioning interface. The top connection point allows for three hundred and sixty degree fore and aft pivoting and positioning. The top connection point 18 and its connection contacts 20 may be made out of any suitable material. In a preferred embodiment, the top connection point and the connection are made out of plastic. The top connection point and its connection contacts may be configured in any suitable shape. In a preferred embodiment, the top connection point 18 has a shape shown in FIGS. 1-4 for reference 18 and the connection contacts have a triangular shape.

The plurality of connection contacts 20 are each configured to receive (i.e., engage) a corresponding mating contact integrated on an accessory (e.g., accessory 27). To securely attach the accessory to the top connection point 18, a knob 26 is attached to the other side of the accessory 27 and a fastener (e.g., bolt 33) may be inserted through the aperture 19 on the fastener receiving surface to the aperture 30 in the knob. The knob 26 includes a threaded aperture 30 that aligns with aperture 19 so that a fastener may thread through each aperture to securely affix the accessory to the top connection point.

The bottom connection point 22 is oriented in a perpendicular fashion relative to the shaft 12 and includes a carve-out 25 which is integrated into its rear surface. The carve-out has a shape commensurate with mating pin structure 31 and is configured to receive the mating pin structure 31 which is positioned at the bottom of an object (e.g., tube 28). The pin (i.e., mating pin 31) may be an anti-rotation pin which prevents the adapter 10 from rotating in the object. The adapter's engagement with pin 31 through its carve-out structure 25, along with bumpers 15a and 15b, provide a secure and stable mount.

The bottom connection point 22 and its carve-out 25 may be made out of any suitable material. In a preferred embodiment, the bottom connection point 22 and its carve-out 25 are made out of plastic. The bottom connection point 22 and its carve-out 25 may be configured in any suitable shape. In a preferred embodiment, the bottom connection point 22 has a circular shape and the carve-out 25 has a triangular shape.

Embodiments of the invention are discussed above with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Moreover, those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

It should be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.)

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

What is claimed is:

1. A convertible tube adapter comprising:
    a top connection point attached to a top end of a shaft, the top connection point including a plurality of connection contacts integrated on a first side of the top connection point, a fastener receiving surface integrated on a second side of the top connection point and an aperture integrated between the plurality of connection contacts and the fastener receiving surface;
    the shaft is configured for insertion into a tube which is fixedly integrated into an object, the shaft including a pair of bumpers extending along a same direction as an extension direction of the shaft, where a first one of the pair of bumpers is located on a side of the shaft, and a second one of the pair of bumpers is located on another side of the shaft;
    a bottom connection point attached to a bottom end of the shaft, the bottom connection point having a carve-out integrated into a surface of the bottom connection, the carve-out configured to receive a mating pin structure positioned at the bottom of the tube to prevent the adapter from rotating in the tube; and
    support structures extending along the side of the shaft and the another side of the shaft in the same direction as the extension direction of the shaft, where a first set of the support structures extends outward from an end of the pair of bumpers towards the top connection point, and a second set of the support structures extends outward from an opposite end of the pair of bumpers toward the bottom connection point;
    wherein the adapter is configured to effectively convert the tube into a mount when the shaft is inserted into the tube by allowing an article to attach to the top connection point of the adapter.

2. The adapter of claim 1, further comprising a knob including a threaded aperture to receive a fastener inserted therein.

3. The adapter of claim 2, wherein the knob is configured to interface with the article to connect the article to the top connection point.

4. The adapter of claim 1, wherein the pair of bumpers each include an insert integrated on a top surface of each respective bumper.

5. The adapter of claim 4, wherein the pair of bumpers are each configured to provide outward pressure on an inside surface of the tube by way of the insert to thereby keep the bottom connection point of the adapter engaged with the mating pin.

6. The adapter of claim 1, wherein the carve-out has a shape commensurate with the mating pin structure.

7. The adapter of claim 6, wherein the carve-out has a cross shape.

8. The adapter of claim 1, wherein the bottom connection point is oriented perpendicular relative to the shaft.

9. The adapter of claim 1, wherein the aperture includes a threaded internal structure.

10. The adapter of claim 1, wherein the plurality of connection contacts are configured to attach to an article having an interface which mates with the plurality of connection contacts.

11. The adapter of claim 1, wherein the top connection point allows for three hundred and sixty degree fore and aft pivoting and positioning.

* * * * *